United States Patent [19]

Young

[11] 4,063,747
[45] Dec. 20, 1977

[54] NOISELESS RATCHET DRIVE MECHANISM FOR THE BICYCLE AND THE LIKE

[76] Inventor: Timothy Tung Jen Young, 788 Walnut 2, San Carlos, Calif. 94070

[21] Appl. No.: 628,074

[22] Filed: Nov. 3, 1975

[51] Int. Cl.² .............................................. B62M 1/04
[52] U.S. Cl. ..................................... 280/255; 192/45; 280/246
[58] Field of Search ....................... 280/255, 258, 246; 192/45

[56] References Cited

U.S. PATENT DOCUMENTS

| | | | |
|---|---|---|---|
| 587,837 | 8/1897 | Latimer | 280/258 |
| 1,809,576 | 6/1931 | Verderber | 192/45 X |
| 2,061,167 | 11/1936 | Nardone | 192/45 |
| 2,225,304 | 12/1940 | Killin | 280/258 |
| 2,653,037 | 9/1953 | Lassiter | 280/258 |
| 3,323,812 | 6/1967 | Young | 280/258 |
| 3,375,023 | 3/1968 | Cox | 280/255 X |

FOREIGN PATENT DOCUMENTS

| | | | |
|---|---|---|---|
| 927,041 | 10/1947 | France | 280/258 |

*Primary Examiner*—John P. Silverstrim

[57] ABSTRACT

A noiseless ratchet drive mechanism consisting of a driven outer member including a sprocket wheel pivoting about the drive shaft and with a ring band forming a shell fixed on each side of the sprocket wheel concentrate to the drive shaft. On each side contiguous to this outer member disposed an inner member, one fixed to and the other pivoted about the drive shaft. Along the perimeter of each inner member disposed a number of ratchet drive mechanism friction engaging the shell, and with lever arms attached to each inner member so that pedaled oscillationwise the outer member is actuated rotating in one direction.

2 Claims, 4 Drawing Figures

U.S. Patent  Dec. 20, 1977  4,063,747
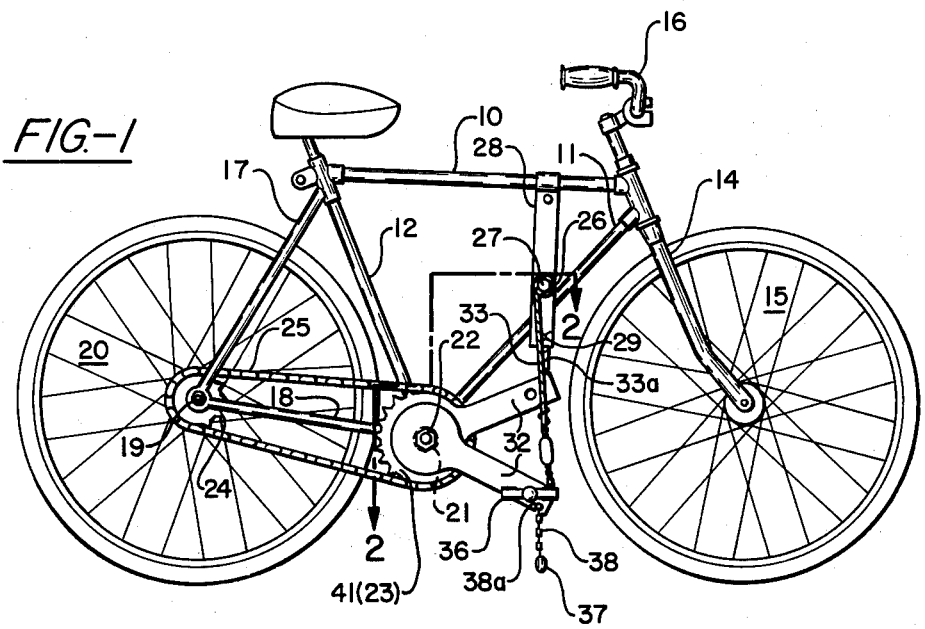
FIG.-1
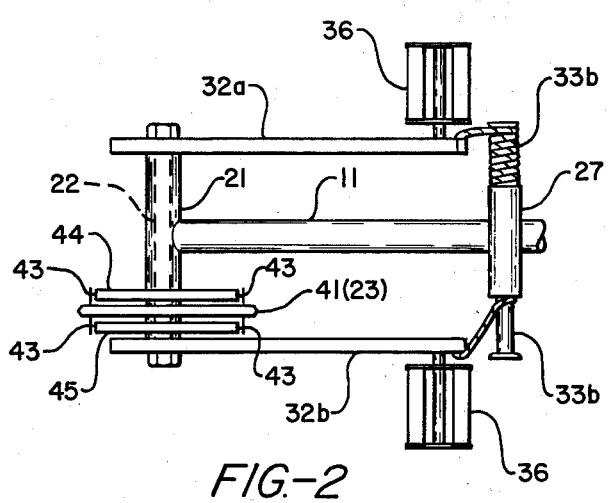
FIG.-2
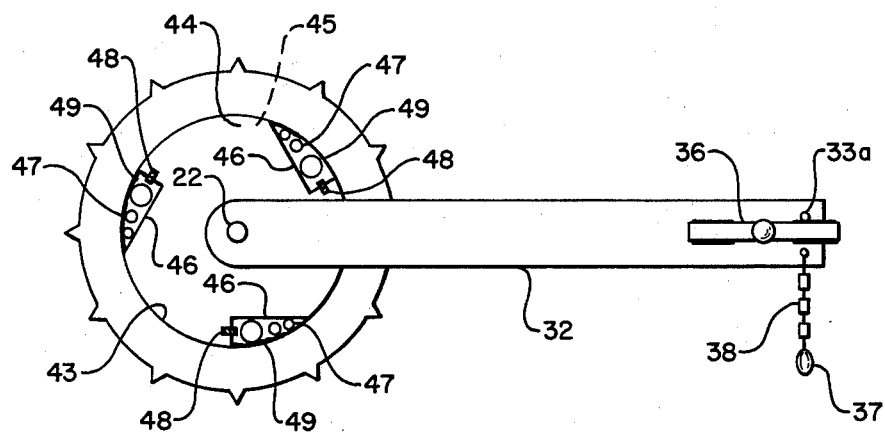
FIG.-3A
FIG.-3

NOISELESS RATCHET DRIVE MECHANISM FOR THE BICYCLE AND THE LIKE

The present application has reference to the application filed by me Aug. 19, 1974 Ser. No. 498,875 and processed by your office to final action May 28, 1975 and abandoned by me and forwarded by your office to the abandoned file Sept. 25, 1975.

This present application is identical to the abandoned application except that instead of the conventional ratchet which creates the click click noise a noiseless ratchet is used.

It is the object of the present improvement to make a noiseless ratchet drive mechanism by pedalling oscillationwise to generate power to impart rotary motions through transmission for one direction drive. This invention is particularly but not exclusively intended for a man-powered vehicle such as a pedal-operated bicycle or the like. Another object and other advantages will appear as the specification continues. The novel features of the present invention will be particularly set forth in the appended claims.

DRAWINGS

For a better understanding of the invention reference should be had to the accompanying drawing, forming part of this specification, in which:

FIG. I is a side elevation view looking at the right side of a bicycle equipped with my improved noiseless ratchet drive mechanism.

FIG. II is an enlarged section view taken along the vertical plane 2—2 of FIG. I.

FIG. III and FIG. III-A is the silent ratchet with lever arm and accessories.

DETAILED DESCRIPTION

Referring now to the drawing in detail, I have disclosed a conventional bicycle having a supporting frame A with an upper tube 10, a lower front tube 11 that is inclined relative to the horizontal, and a rear upwardly extending tube 12. The supporting frame has a front fork 14 journaled therein and this fork is provided with a front wheel 15 which may be steered by handle bar 16. Upper and lower rear forks 17 and 18, respectively, of the supporting frame A has an axle 19 mounted thereon for a rear wheel 20.

As shown in FIG. I the tubes 11 and 12 and the fork 18 provide a support for a transverse bearing tube 21. It will be apparent from FIG. I that a drive shaft 22 is journaled in this bearing tube and has a drive sprocket 23 fixed thereto. The ground engagement rear wheel 20 is provided with a driven sprocket 24 on its axle 19, and an endless chain 25 is trained over the drive and driven sprockets 23 and 24, respectively so that rotation of the driven sprocket will actuate the driven sprocket to propel the bicycle, or the like.

The parts thus far described are conventional and now I shall set forth my modified improved drive mechanism in detail, as follows:

It will be seen from FIG. I and FIG. II that for mounting the bearing tube 26 and the attachment shaft 27 journaled in it, a bracket 28 is secured to the upper tube 10 and the lower front tube 11 by clamping bolts 29.

A single sprocket wheel forming the outer member 41, in place of sprocket wheel 23, and pivoted about the drive shaft 22 and not keyed as sprocket 23 is keyed to drive shaft 22, and around this said sprocket wheel 41 on each side is disposed a circular band forming shells 43 concentrate to the drive shaft 22, and on the left looking in the direction of the drive is disposed the left inner member 44, keyed to the drive shaft 22 and fitting inside the shell 43, and on the right the inner member 45 pivoted about the drive shaft 22 and fitting inside the shell 43, and disposed at the perimeters respectively of the inner member 44 and inner member 45 are a number of tapered slots 46 each with matched bearing balls or bearing rollers, and a compression spring 48 to keep the balls or rollers 47 in wedging position, and a shoe 49 disposed between the shell 43 and the balls or rollers 47 for friction driving engagement; and on the left lever arm 32a with pedal 36 fixed perpendicular to it is keyed to drive shaft 22, and on the right a lever arm 32b with pedal 36 fixed perpendicular to it is attached to the right inner member 45; for oscillation of the lever arms a pair of cables 33 attached one end of each to the tip of each lever arm at 33a and the other end of each cable wound around and anchored at each end of the attachment shaft 27 at 33b, one clockwise and the other counterclockwise. For regulating the distance of travel of each cable a turn-buckle 34 with left-and-right screw threads is fitted to each cable. For a stop to the travel of the cable 33 on attachment shaft 27 a compression spring 35 is fitted to the upper part of the turn-buckle 34. A weight 37 is suspended by a link chain 38 from the tip of each lever arm for gravity leverage by vertical pull.

I claim:

1. In an occupant propelled vehicle including a frame, a ground engaging wheel mounted on said frame, a driven sprocket for rotating said wheel, a drive sprocket, and an endless sprocket chain trained over said drive and driven sprockets, the improvement comprising: a ratchet drive mechanism for driving said drive sprocket, said mechanism comprising a drive shaft freely journaled concentric to said drive sprocket, a first lever arm fixed to one end of said shaft, a second lever arm freely rotatable on the other end of said shaft, a first inner member, having an outer periphery, fixed to said shaft on one side of said drive sprocket adjacent said one end, a second inner member, having an outer periphery, fixed to said second lever arm on the other side of said drive sprocket, a first band shell fixed to said one side of said drive sprocket, said first band shell having an inner surface complementing said outer periphery of said first inner member, a second band shell fixed to said other side of said drive sprocket, said second band shell having an inner surface complementing said outer surface of said second inner member, said periphery of each inner member including a plurality of spaced, tapered, slots, a plurality of rollers mounted in each slot, a shoe positioned in each slot between said rollers and said inner surface of said band shell, a spring in each slot for urging said rollers into a position wedging said shoe into frictional engagement with said inner surface, an attachment shaft journaled on said frame, a first cable means having one end attached to the tip of one of said lever arms and the other end wound clockwise on said attachment shaft, and a second cable means having one end attached to the tip of the other of said lever arms and the other end wound counterclockwise on said attachment shaft, a turn-buckle with right-and-left threaded screws fitted to each of said cable means whereby the cable length may be adjusted and a compression spring mounted on said turn-buckle for moving into stopping engagement with said attachment shaft to limit the travel of said cable means.

2. In an occupant propelled vehicle as claimed in 1, the improvement further comprising a leverage adding weight suspended from the tip of each of said lever arms by a link chain.

* * * * *